United States Patent Office 3,223,612
Patented Dec. 14, 1965

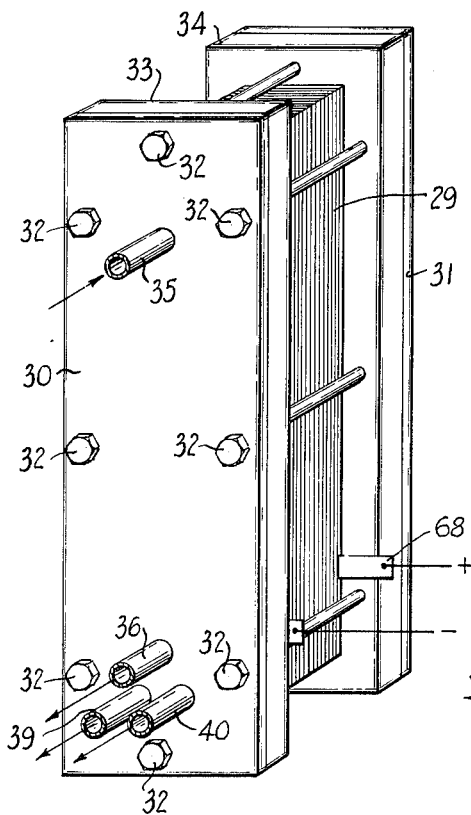
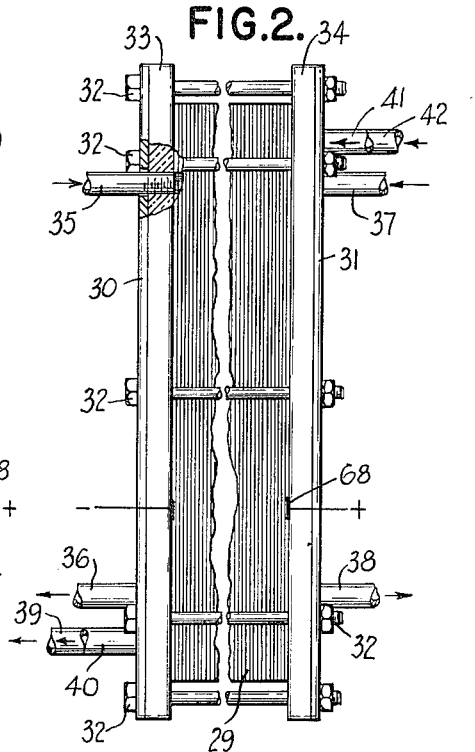
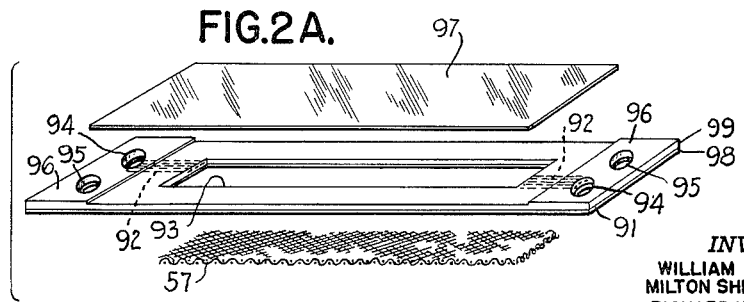

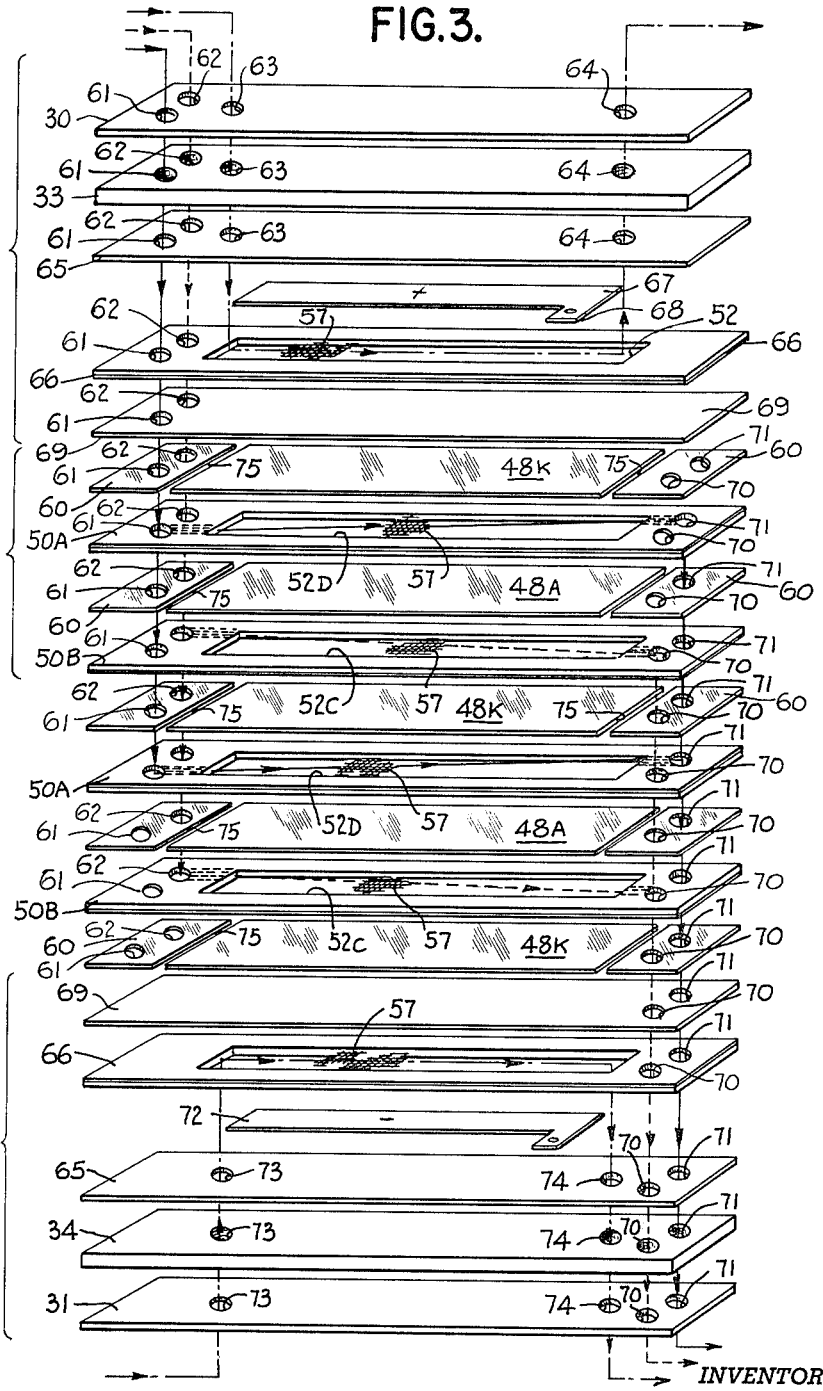

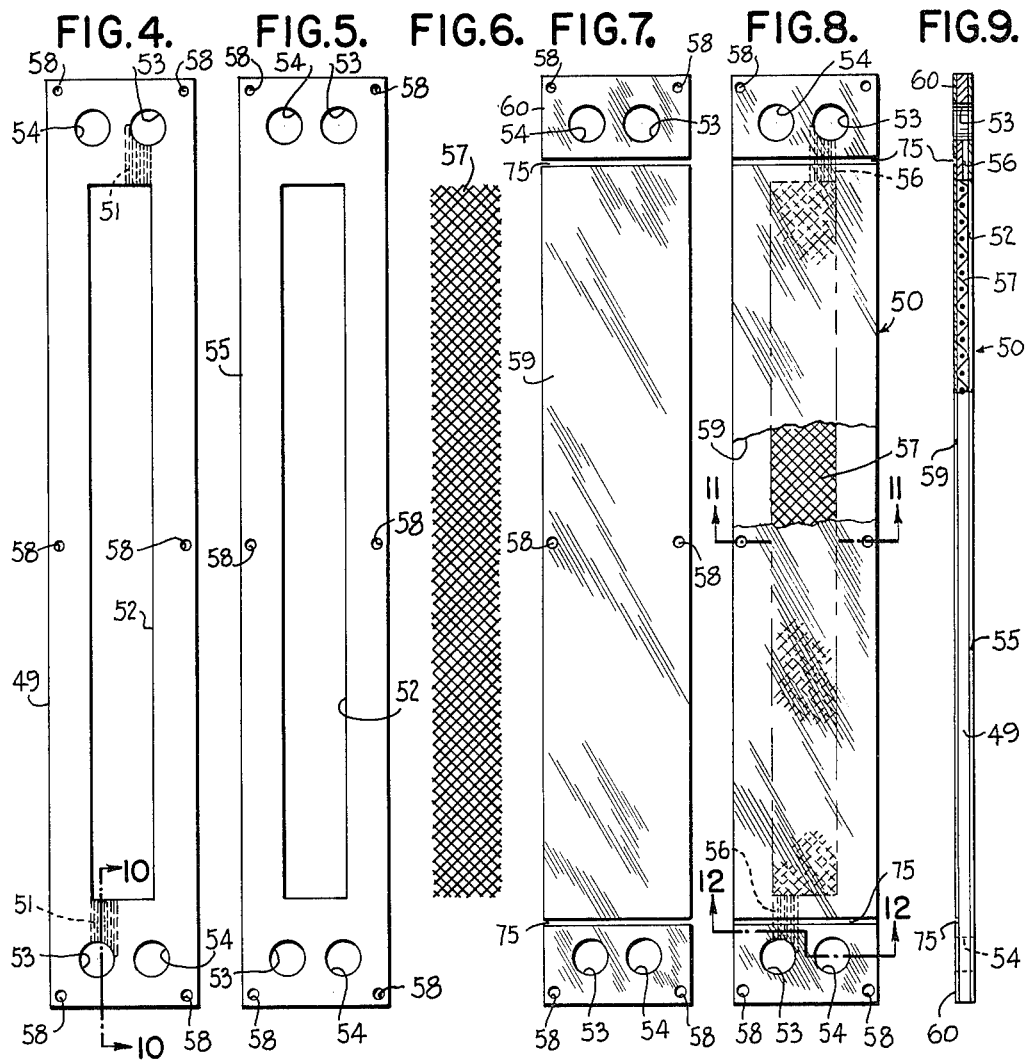

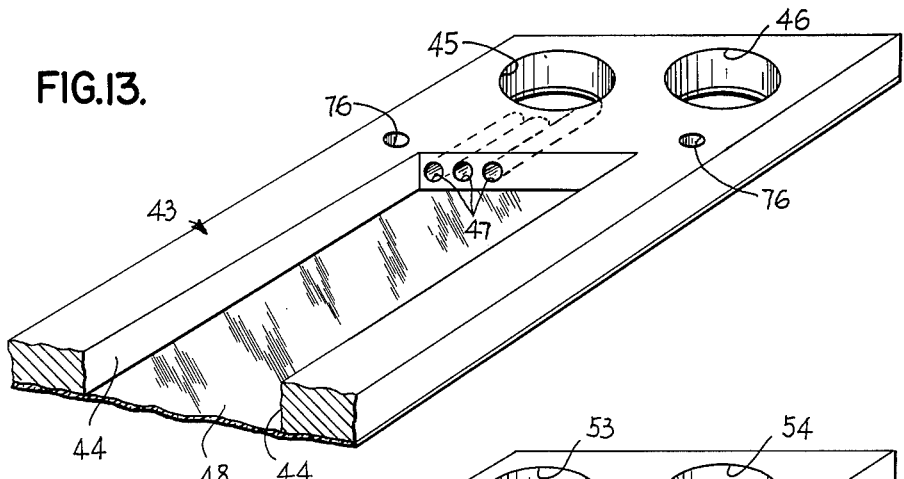
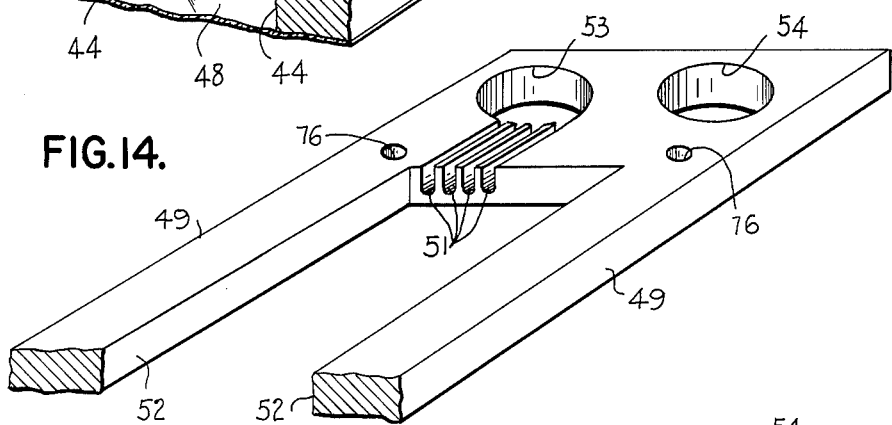
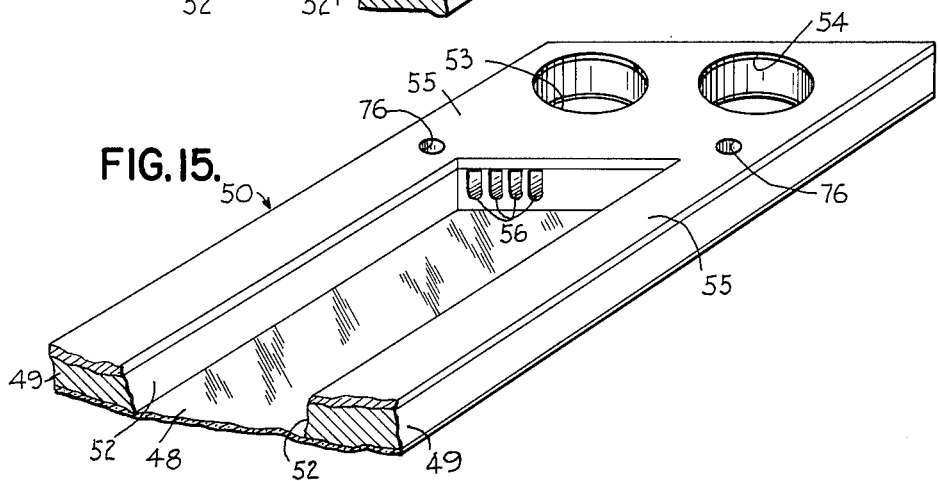

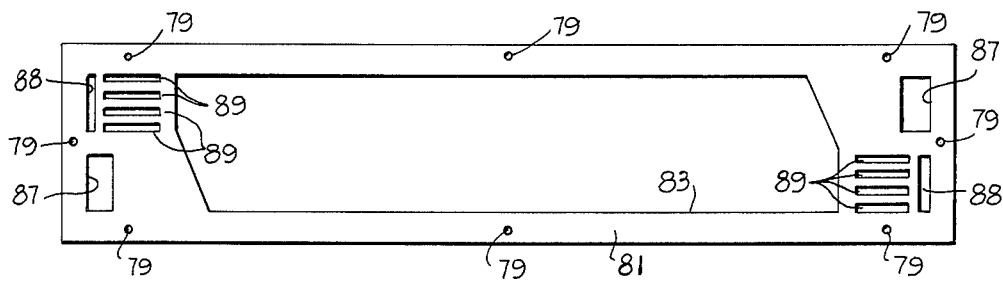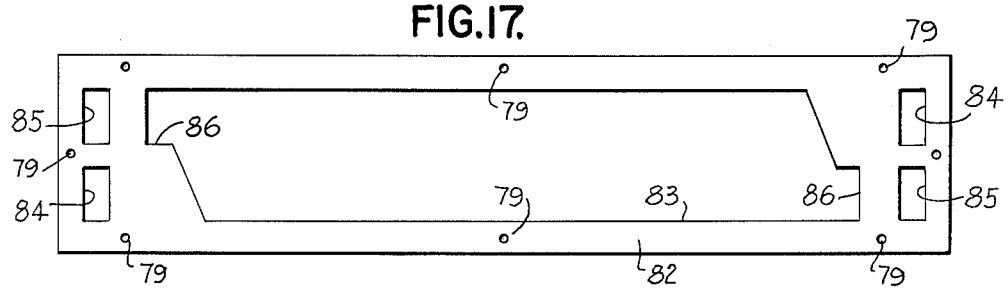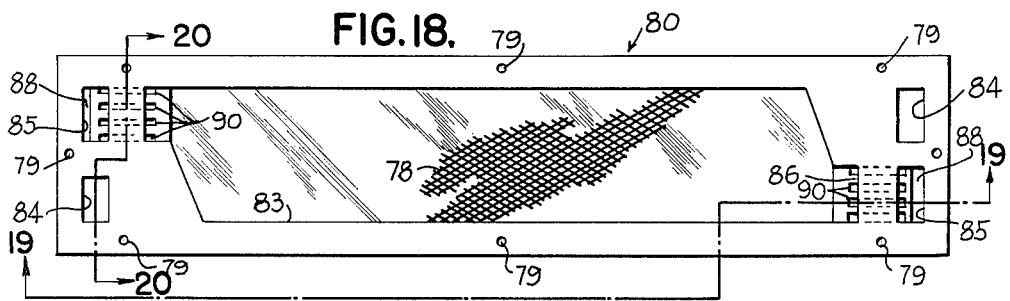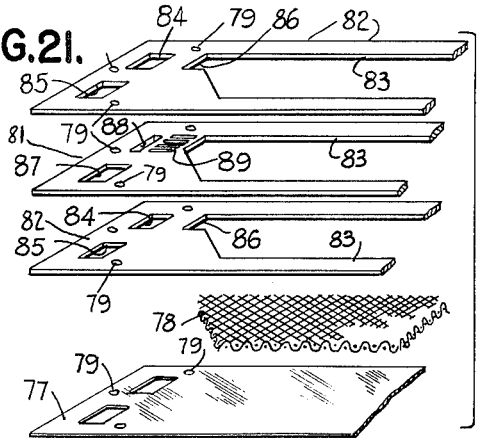

3,223,612
FLUID TREATMENT
William Kwo-wei Chen and Milton Sheldon Mintz, Stamford, and Richard Neilsen Smith, East Norwalk, Conn., assignors to American Machine and Foundry Company, Inc., a corporation of New Jersey
Filed Oct. 2, 1959, Ser. No. 844,046
12 Claims. (Cl. 204—301)

This invention relates in general to multple chamber fluid treatment devices, and, more particularly, to the construction of dialysis and electrodialysis stacks containing membranes without fluid flow apertures.

For the purposes of this invention electrodialysis is considered a special case of dialysis. Dialysis and electrodialysis apparatus often consists of stacks of alternating membranes and gasket spacer elements which are clamped together. The membranes are positioned by the gaskets to form cells. Aligned fluid flow apertures may be formed through both the membranes and the gasket elements to provide manifold passages. Where fluid flow apertures in both membranes and gaskets are used, precise alignment must be maintained during assembly procedures, since small distortions can make the unit inoperable. These manifold passages conduct fluid to be treated into and out of the appropriate cells where it is concentrated or diluted. Since the gaskets are typically about 10 to 200 mils thick to position the membranes that distance apart, fluid has been usually directed up to this time to or form a given manifold passage through a completely cut out slot in a gasket. This slot has extended from a particular manifold passage to or from a given cell.

One major disadvantage resulting from this method of constructing cell stacks has been that the pairs of membranes on each side of the given cut out slot extending from a manifold passage to a cell may easily flex into the slot as these membranes are thin and quite flexible. Such flexing into a slot would allow fluid to flow past the edge of the membrane, and then leak back behind the membrane where it is bowed outwards away from the unslotted portion of an adjacent gasket. Since an electrodialysis stack consists of an alternating series of diluting and concentrating cells, flexing of the membrane could allow some fluid from a given manifold to flow into the wrong adjacent cells, or it could allow some fluid from a given cell to flow into the wrong exhaust manifold, causing contamination.

It is, therefore, an object of this invention to provide a cell stack in which fluid does not leak into the wrong manifold passages or into the wrong cells.

A further object of this invention is to provide a cell stack in which the membranes do not contain fluid flow apertures forming parts of manifold passages and in which there is no fluid flow past the edge of a membrane.

A still further object of this invention is to provide a cell stack in which shrinkage and other mechanical distortions of the membranes during disassembly or use will not prevent or render difficult the reassembly of the stack.

Another object of this invention is to provide more complete hydraulic isolation of the cells and their manifolds in a cell stack than has heretofore been practical.

Yet another object of this invention is to provide cell stack gaskets or spacers containing integral internal passages leading from manifold apertures in the gaskets to the cell or open central portions of the gaskets.

Still another object of this invention is to provide less difficult and expensive methods of fabricating cell stack gaskets containing integral internal passages.

An additional object of this invention is to provide cell stack construction which will insure that any leakage past the membranes will not contaminate adjacent cells but will harmlessly run outside the stack.

Another object of this invention is to provide cell stack gaskets which have integrally formed thicker manifold spacer portions containing manifold apertures so that membranes, which do not contain any manifold or fluid flow apertures for example, may be interspersed between the gaskets.

Another object of the invention is to provide simplified construction assembly and disassembly of electrodialysis and dialysis devices.

Another object is to provide a cell construction wherein fluid flow is controlled and indexed by blocking of selected portions of manifold apertures by inserting in the manifold stream a non-perforate spacer member.

Many more objects, advantages and features of invention reside in the construction, arrangement and combination of parts involved in the embodiments of the invention and its practice, as will be understood from the following description and accompanying drawing wherein:

FIG. 1 is a perspective view of an electrodialysis stack;

FIG. 2 is a side view of an electrodialysis stack, with the central portion broken away and with a small additional portion broken away in section to show internal construction;

FIG. 2a is an exploded perspective view of a cell stack gasket having integrally formed manifold spacer portions with a screen spacer and a membrane containing no fluid flow apertures shown below and above it;

FIG. 3 is an exploded perspective view of the elements forming an electrodialysis stack;

FIG. 4 is a plan view of a base element of a laminated gasket;

FIG. 5 is a plan view of a cover element of a laminated gasket;

FIG. 6 is a plan view of a screen spacer element;

FIG. 7 is a plan view of a membrane with a manifold spacer shown at each end;

FIG. 8 is a plan view of an assembled laminated gasket, a membrane and two manifold spacers with the central portion of the membrane broken away;

FIG. 9 is a side view of an assembled laminated gasket, a membrane and manifold spacers with the assembly partially broken away in section;

FIG. 10 is a section taken on line 10—10 of FIG. 4;

FIG. 11 is a section taken on line 11—11 of FIG. 8;

FIG. 12 is a section taken on line 12—12 of FIG. 8;

FIG. 13 is a perspective view of a broken away end of a gasket from one embodiment of this invention;

FIG. 14 is a perspective view of a broken away end of a base element of a laminated gasket from a second embodiment of this invention;

FIG. 15 is a perspective view of a broken away end of an assembled laminated gasket from a second embodiment of this invention;

FIG. 16 is a plan view of the center piece of a laminated gasket from a third embodiment of this invention;

FIG. 17 is a plan view of either a top or a bottom cover piece of a laminated gasket from a third embodiment of this invention;

FIG. 18 is a plan view of an assembled laminated gasket from a third embodiment of this invention;

FIG. 19 is a partial section taken on line 19—19 of FIG. 18;

FIG. 20 is a section taken on line 20—20 of FIG. 18; and

FIG. 21 is an exploded perspective view of a membrane and the elements comprising the laminated gasket from a third embodiment of this invention.

Referring to the drawing in detail, FIGS. 1 and 2 show an assembled electrodialysis stack, generally designated by the numeral 29, which is clamped between two end plates 30 and 31, which may be steel or other rigid material, which are drawn together as the bolts 32 are tightened. Heavier blocks of electrical insulating material 33 and 34 may be disposed inside the end plates 30 and 31 and the bolts 32 are thus disposed beyond the center of the stack 29 and electrically insulated from it. The end plate 30 and block 33 have the cathode washing stream intake and exhaust pipes 35 and 36 fixed into them. The end plate 30 also receives the product stream pipe 39 and the concentrate stream pipe 40. In a like manner, the end plate 31 receives two intake stream pipes 41 and 42. As may be seen in the broken away section of FIG. 2, these pipes 35, 36, 37, 38, 39, 40 and 41 lead to fluid flow apertures formed in the elements comprising the stack 29. These fluid flow apertures in the stack elements form manifold passages within the stack 29.

Referring now to FIG. 13, the gasket 43 represents a first and preferred embodiment of the invention. Each gasket 43 is an elongated rectangle in its external shape with a central rectangular cut out portion 44. Pairs of fluid flow apertures 45 and 46 at each end of the gasket 43 form manifold passages. Communicating from one of these fluid flow apertures 45 or 46 to the cut out chamber 44 are the small passages 47. Thus each end of the gasket 43 contains small passages 47 communicating with oppositely disposed fluid flow apertures to form hydraulic connections. A membrane 48 would lie next to each gasket 43 in a manner that will be described. The small apertures 76 are used to align the gaskets in a cell stack. Edge notches or slots may also be used.

This gasket 43 may be molded or otherwise fabricated from any plastic material which is chemically inert, electrically non-conductive, and mechanically strong. The preferred materials are rigid plastics such as asbestos filled phenolics, "Bakelite," unplasticized polyvinyl chloride, high impact polystyrene, high density polyethylene or the like. The passages 47 may be molded about pins in a die which are afterwards withdrawn, or they may be drilled after the fabrication of the gasket 43; however, since these gaskets 43 are usually about 10 to 200 mils thick, the passages 47 are small.

FIG. 14 shows a base portion 49 of a laminated frame gasket 50 in another embodiment. This base portion 49 lends itself to easy fabrication, as it may be injection molded without being withdrawn from the mold to form apertures. The grooves 51, which communicate between the rectangular chamber 52 and one of the pairs of fluid flow apertures 53 and 54, may be molded directly in a two part mold. A cover portion 55 may be stamped or molded with the corresponding pairs of fluid flow apertures 53 and 54 at each end and with a central rectangular chamber 52. As shown in FIG. 15, when this cover 55 is glued or otherwise fixed over the base 49, a laminated gasket 50 results with the passages 56 communicating between the chamber 52 and one of the pairs of fluid flow apertures 53 and 54. A membrane 48 is disposed on each side of each gasket 50 when they are assembled into a stack.

The use of membranes without fluid flow holes is an outstanding feature of this invention. If membranes can be used which contain no fluid flow apertures, an advantage results in that the membranes may shrink or swell during the use or disassembly of a stack and then they may be reassembled without any concern for the alignment of fluid flow apertures at the ends of the deformed membranes. Membrane alignment is thus not critical. In practice, a membrane 30 inches long may shrink or swell as much as one-eighth to one inch which may render the reuse of the membrane difficult or impossible. This is important in large sacks.

FIGS. 4 through 12 show how a gasket 50 may be assembled with a membrane containing no fluid flow apertures. FIG. 4 shows the base portion 49 containing the pairs of fluid flow apertures 53 and 54 with the grooves 51 extending from the fluid flow apertures or manifold passages 54 to the chamber 52. FIG. 5 shows a cover 55 on which the base 49 may be placed. Small apertures 58 or notches are formed in the base 49 and the cover 55 to assist in their alignment by pins or rods, for example. The screen spacer 57, which is formed from expanded rigid polyvinyl chloride or other suitable material, is placed in the chamber 52 of the resulting laminated gasket 50.

Then, as shown in FIGS. 7 and 8, a membrane is placed over the laminated gasket 50 to extend beyond the chamber 52 and a part of the way over the passages 56. The apertures 58 at the center edges of the membrane are only to assist in its alignment and may be omitted since no liquid flows in them.

Manifold spacers 60 containing fluid flow apertures 53 and 54 are formed of flexible elastic gasket material. They may be made for example of natural or synthetic rubber, polyvinyl chloride, nylon, polyolefins or the same material as the gasket 50. They are aligned by the holes 58 at the ends of the gasket 50. A small clearance 75 which acts as a leakage vent is left between the ends of the membrane 59 and the manifold spacers 60. If shrinkage or other distortion of the membrane 59 occurs during disassembly or use of the stack, this clearance 75 would merely increase or decrease without any problem of alignment arising. Manifold spacers 60 may be of material which is less expensive or more easily fabricated than the membrane itself. This material should have good gasketing properties and be bondable to the gasket frames 50.

The manifold spacers 60 may be used for indexing and controlling the internal flow pattern of the electrodialysis stack by blocking fluid flow holes such as 61, 62, 70 and 71 to create series flow, for example, of the concentrate or dilute streams in selected parts of the stack. A spacer 60 may be selectively used with less than two holes for fluid flow. The cover 55 shown in FIG. 5 may be similarly used with less than four holes. A further advantage of this construction allows the use of rigid or semi-rigid gasket frames 50 of modular design which may be stamped or molded.

The cost of membranes in this construction is reduced and improved area utilization of membranes results. In cell construction where membranes with fluid flow holes are used in manifolding, about a quarter of the membrane area may be devoted to use at the ends where no ion exchange or dialysis occurs. In the hole-less construction of this invention, substantially all of the expensive membrane material is used for fluid treatment and stagnant areas at inlet and outlet areas are avoided.

FIG. 3 shows all the arranged elements of an electrodialysis stack according to this invention. A steel plate 30 or other reinforcement member, a plastic block 33, and an insulating sheet 65 contain the two fluid intake apertures 61 and 62 at one end and also contain the anode washing, intake and fluid exhaust apertures 63 and 64. The reinforcement plate 30 is not needed if the block 33 is rigid enough. Below the insulating sheet 65 lies the gasket 66 which contains no passages connecting the fluid flow apertures 61 or 62 to its central cut out chamber 52. This chamber 52 contains the anode 67 which may be of platinum foil or other suitable material. An electrical connection 68 extends from this anode to be connected to a positive current source. The connection 68 may also be seen in FIGS. 1 and 2.

After the gasket 66, there is placed a "Dynel" sheet 69. "Dynel" is a copolymer of vinyl chloride and acrylonitrile. Use of this sheet 69 is explained hereafter.

Following the "Dynel" sheet 69 there are placed a number of layers each consisting of a cation permeable membrane 48K with suitable manifold spacers 60, a gasket 50A, an anion permeable membrane 48A with suitable manifold spacers 60, and another gasket 50B. It is to be noted that the gaskets 50A and 50B are identical except that the gasket 50B is the same as gasket 50A in the inverted position. Thus fluid may flow from the intake manifolds formed by the aligned fluid flow apertures 61 and 62 into alternate chambers 52C or 52D. In a like manner, fluid flows from these alternate chambers designated 52C or 52D into either a manifold formed by the fluid flow apertures 70 or a manifold formed by the fluid flow apertures 71.

As long a series of cells may be built up in this manner as described by stacking up the alternate layers of gaskets 50A and 50B with the interspersed membranes 48K and 48A. At the other end of the stack, the lower end as shown in FIG. 3, there follows in reverse order another "Dynel" sheet 69 and another gasket 66 containing in this case a cathode 72. Another insulating sheet 65, another plastic block 34 and another end plate 31 follows, each containing the fluid flow apertures 70 and 71 and also containing the cathode washing intake and fluid exhaust apertures 73 and 74.

When these elements are all clamped tightly together, it may be seen that the anode washing stream entering fluid aperture 63 flows into the chamber 52 of the gasket 66 and then can only exhaust through the flow aperture 64. The cathode 72 is washed in a similar manner through the fluid flow apertures 73 and 74. Both the anode and the cathode are so washed to prevent the deposit and build-up of foreign matter which could affect their functioning.

If a salt water such as sea water were being treated in the apparatus, chlorine would be liberated at the anode 67 which would attack the adjacent membrane 48K. For this reason the "Dynel" sheet 69 is interposed between the membrane 48K and the anode 67 to prevent or reduce such attack. This sheet is preferably of a porous, non-woven "Dynell" matting which is sufficiently porous to allow either anions or cations to pass while resisting the attack of chlorine or other degradation agents generated at the anode or cathode. This sheet 69 need not be of "Dynel," the preferred material, but it should be of porous, relatively inert material such as mineral fiber, for example, glass or asbestos.

As shown in FIG. 3, the waste stream or concentrate would exhaust from the electrodialysis stack through the fluid flow apertures 71 while the product stream or dilute stream would exhaust through the flow apertures 70 because the electrodialysis cells formed within the gaskets 50A are concentrating cells while those cells formed within the gaskets 50B are diluting cells. The waste stream may be returned to the stack to wash the anode and the cathode if, for example, it is desired to conserve the fluid being treated in the apparatus.

FIG. 18 shows an assembled laminated gasket 80 which consists of the thicker central portion 81 shown in FIG. 16 sandwiched between two thinner cover portions 82 which are shown in FIG. 17. The center 81 and the cover portions 82 contain the elongated chamber 83. In each end the covers 82 contain the pairs of fluid flow apertures 84 and 85 and an extension 86 of the chamber 83 which leads toward the fluid flow apertures 85. The center 81 contains the fluid flow apertures 87 and 88 in each end, as well as the lengthwise slots 89. When a gasket 80 is assembled, the slots 89 become the passages 90 extending from the chamber 83 to the manifold passages formed by the fluid flow apertures 85 and 88. As may be seen in FIG. 19, the fluid flows from the chamber 83 above and below the end of the chamber in the center portion 81 to enter the passages 90. At the other end of the passages 90, the fluid again flows upward and downward to enter the apertures 84 which form a part of the exhaust manifold passage. Small alignment holes or slots 79 may be provided to assist in the assembly of the gaskets 80 and then the entire stack.

These laminated gaskets 80 may be stamped from a suitable material and then glued or bonded together, as by heat fusion, with a considerable saving of cost. After fabrication, the gaskets 80 may be assembled in the manner that has been described for the gaskets 50 as seen in FIG. 3 to form an electrodialysis stack for example.

As shown in FIG. 21, a suitably modified membrane 77 and a screen spacer 78 are used in connection with these gaskets in the stack. The screen spacers position the membranes within an assembled stack while allowing easy fluid flow through the cells. Either the complete membrane 77 which includes fluid flow apertures as seen in FIG. 21 may be used, or a membrane without fluid flow holes may be used in combination with a manifold spacer 60 as shown in FIG. 3.

The gaskets in an electrodialysis stack should be thin because too great a thickness may increase the distance between the electrodes with a resulting increase in electrical resistance, while too great a decrease in the thickness of the gaskets will overly increase the hydraulic resistance of the flow between the membranes. Therefore, the size of the passages within the gaskets communicating with the manifold fluid flow apertures is limited. Since these passages should be as large as is reasonably possible, the wall of the gaskets may flex to some slight degree into the passages.

If membranes containing manifold apertures extend the entire length of the gaskets, and also flex as the gasket walls may, some slight leakage from the manifold apertures may flow past the edges of the membranes into the wrong cells. However, with membranes installed as shown in FIG. 3, without manifolding fluid flow apertures and installed with manifold spacers 60 which themselves contain the manifold apertures, any slight leakage from the chambers 53 or the fluid flow manifold passages will be vented in the small clearance 75 between the ends of the membranes 48A and 48K and the manifold spacers 60. This leakage will then run outside the stack to drip harmlessly away. This result in the superior hydraulic isolation of the cells as any leakage must then be external to the stack and cannot pollute the product stream.

FIG. 2A shows a further modification of the invention. A generally rectangular gasket 91 contains the passages 92 extending from the large central chamber 93 to one of the pairs of fluid flow apertures 94 and 95. The gasket 91 may be of the laminated type shown in FIG. 8 or FIG. 18; it may be of the type shown in FIG. 13; or it may be of another type altogether. The main feature of this gasket 91 is the provision of the two integral manifold spacers 96 which may be bonded to the gasket.

The membrane 97 fits between these manifold spacers 96 with a slight clearance and the screen spacer 57 lies within the chamber 93. This form of the invention is very easy to assemble as the manifold spacers do not need to be separately placed in position. Membranes may be glued to gasket frames to simplify assembly further. For example one membrane may be bonded to each frame or one membrane of each kind may be bonded to either side of the gasket.

While the invention is shown in FIG. 3 with parallel flow in the adjacent cells formed between the gasketed memebranes, the invention is not so limited as there could be counterflow in the opposite directions in the adjacent cells by introducing the fliud to be treated into different manifods. There can also be series flow of one or both the dilute or concentrate streams. Also the stack may be constructed so that there is a general counterflow with the fluid to be treated entering the stack from opposite ends and with the concentrate stream and the dilute product stream emerging from opposite ends.

The construction of this invention may also be applied to dialysis cell construction where no current is used.

What is claimed is:

1. A dialysis device comprising, in combination, layers of gaskets, each gasket having at least two fluid flow apertures passing through it, a cut out portion in each gasket forming a cell frame, membranes free from fluid flow apertures interspersed between said gaskets, and manifold spacers associated with said gaskets with said manifold spacers containing fluid flow apertures aligned with the fluid flow apertures in said gaskets to form manifold passages, hydraulic connections between at least two manifold passages and each cut out portion, said membranes extending beyond the cut out portions of adjacent gaskets to form cells.

2. The combination according to claim 1 wherein said membranes extend partially over the hydraulic connections leaving a clearance between said membranes and said manifold spacers.

3. The combination according to claim 2 wherein said manifold spacers are formed integrally with said gaskets.

4. In a dialysis cell stack comprising layers of membranes and gaskets interspersed between the membranes, a laminated gasket comprising, in combination, an inner piece containing a cut out central portion, first fluid flow apertures passing through the periphery of said inner piece, and holes a part of the way between the cut out portion and at least two of said first fluid flow apertures, and outer covers between which said inner piece is sandwiched, said covers containing a cut out central portion, extensions of said cut out portion extending over the ends of the holes in said inner piece, and second fluid flow apertures aligned with those in said inner piece and extending over the ends of the holes in said inner piece.

5. The combination according to claim 4 wherein said inner piece and said covers are elongated and contain oppositely disposed pairs of fluid flow apertures in each end with one fluid flow aperture in each pair of fluid flow apertures in each cover extending partly over the holes which are extended to form slots in said inner piece.

6. An electrodialysis stack according to claim 1 comprising, an anode, a cathode and electrodialysis cells formed by membranes and gaskets disposed between said anode and said cathode, and two porous sheets of inert material disposed between said anode and said cathode and next to the membranes adjacent to them protecting the adjacent membranes from attack by elements produced at the anode and the cathode.

7. The combination according to claim 2 wherein the clearance between the membranes and the manifold spacers serves as a leakage vent and allows the membranes to deform.

8. A device according to claim 1 wherein fluid flow in individual cells is controlled by indexing the fluid flow apertures by blocking off some of the apertures at least in part to direct the flow of fluids.

9. An electrodialysis stack according to claim 1 comprising, in combination, two electrodes and electrodialysis cells formed by membranes and gaskets disposed between said electrodes, and a sheet of porous inert material disposed between at least one electrode and the membrane adjacent said electrode, protecting said adjacent membrane from attack by material generated at said electrode.

10. The combination according to claim 6 wherein said sheets of inert material are of porous, non-woven material.

11. A dialysis device comprising, in combination, gaskets having an elongated inner piece containing a cut out central portion, fluid flow apertures in the ends of said inner piece, and slots in said inner piece extending a part of the way between the cut out central portion and at least two of said fluid flow apertures, and elongated outer covers between which said inner piece is sandwiched, said covers containing a cut out central portion, extensions of the cut out portion extending over the ends of the slots in said inner piece, and additional fluid flow apertures aligned with the fluid flow apertures in said inner piece and extending over the ends of the slots in said inner piece, said gaskets being stacked upon each other, membranes interspersed between said gaskets each of said membranes extending over the cut out central portions of adjacent outer covers and terminating between the ends of the cut out central portions of adjacent outer covers and the additional fluid flow apertures in said adjacent outer covers, and spacer members disposed with clearance beyond each end of each of said membranes, said spacer members containing apertures aligned with the additional apertures in adjacent outer covers.

12. The combination according to claim 11 with the addition of a pair of alignment apertures formed along the sides of said membranes and with a corresponding pair of alignment apertures formed in said gaskets.

References Cited by the Examiner
UNITED STATES PATENTS

| | | | |
|---|---|---|---|
| 2,686,154 | 8/1954 | MacNeill | 210—321 |
| 2,756,206 | 7/1956 | Gobel | 210—321 |
| 2,758,083 | 8/1956 | Van Hoek et al. | 204—301 |
| 2,848,402 | 8/1958 | Van Dorsser | 204—257 |
| 2,872,406 | 2/1959 | Buchanan | 204—296 X |
| 2,878,178 | 3/1959 | Bier | 204—301 X |
| 2,881,124 | 4/1959 | Tye | 204—301 |
| 2,894,894 | 7/1959 | Kressman et al. | 204—301 |
| 2,897,130 | 7/1959 | Van Dorsser et al. | 204—301 |

WINSTON A. DOUGLAS, *Priamry Examiner.*

JOHN H. MACK, JOHN R. SPECK, *Examiners.*